Patented Aug. 21, 1945

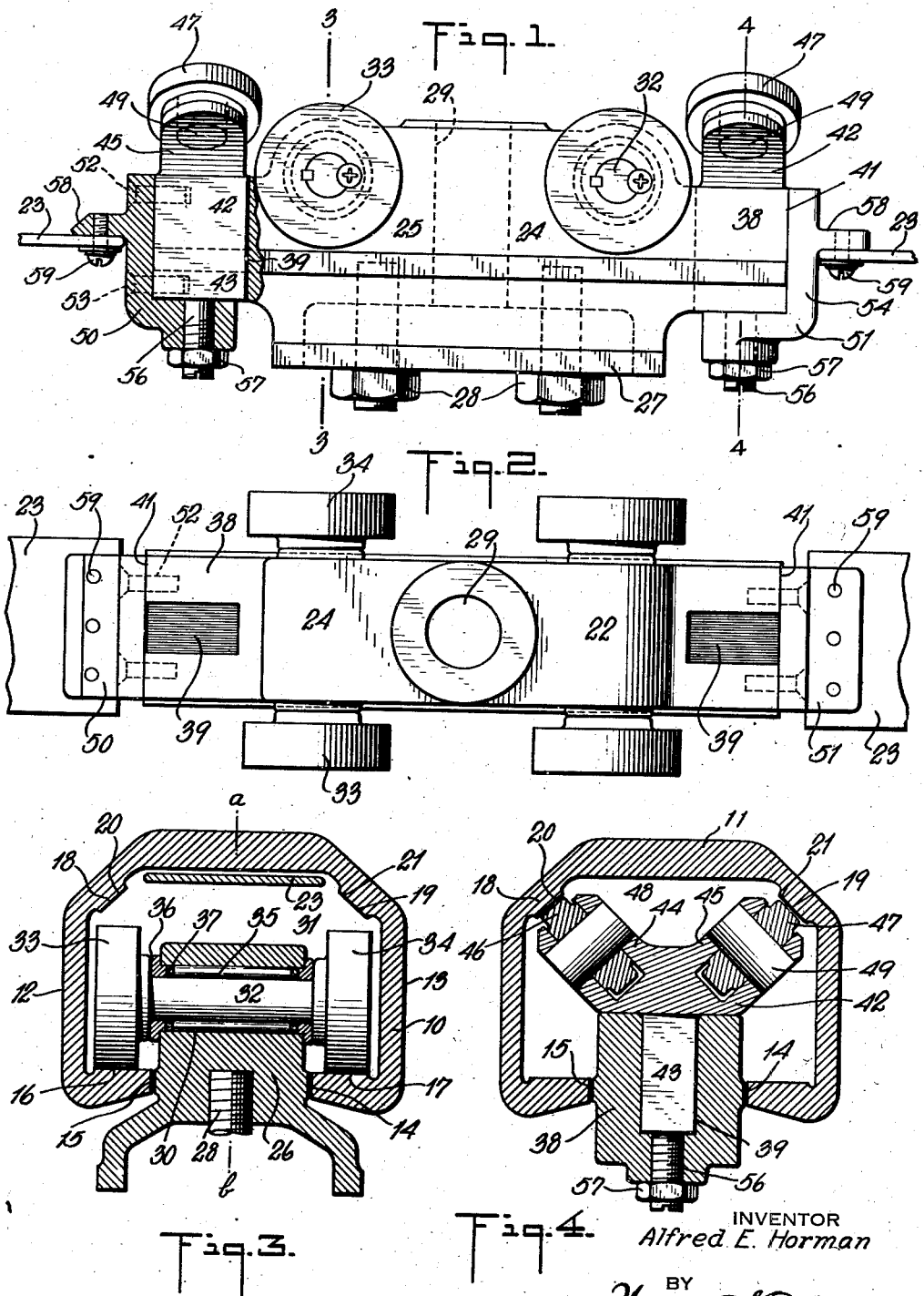

2,383,195

UNITED STATES PATENT OFFICE 2,383,195

WOODWORKING MACHINE CARRIAGE

Alfred E. Horman, New York, N. Y.

Application October 6, 1943, Serial No. 505,106

9 Claims. (Cl. 308—6)

The invention relates in general to a woodworking machine in which a carriage for supporting a cutting tool, with or without an associated driving motor, is mounted for adjustable longitudinal movement in a cantilever arm disposed to overhang the work operated upon by the tool. The invention specifically relates to an improvement in the carriage element of such machine, and to those parts of the carrying arm which cooperate therewith.

In machines of this character it is a vitally necessary requirement that the carriage be confined exactly to its permissible movement along a line lengthwise of its supporting arm, and therefore that it be restrained from any lateral movement in either direction away from this line. At the same it is is required that the carriage possess a high degree of freedom of longitudinal movement and this freedom of movement should not be restricted or restrained even though motors and other heavy parts or tools are hung from the carriage. It is also appreciated that irrespective as to how accurately the parts are machined as originally constructed, unavoidable wear and thus deviations from the original dimensions eventually develops in the wearing parts, and such wear is apt to develop at least some, and often a material extent of loose play in the original close fit of the several relatively movable parts. In such devices as heretofore known many schemes have been proposed for taking up this wear but this usually adds to the complexity of the machine, and in turn provides parts which are very apt to get out of order or loose under the severe vibratory movements and shocks to which machines of this character are subjected while in use.

The primary object of this invention is to provide an extremely simplified form of rugged carriage in which the component parts have been reduced to a minimum to provide a carriage and associate arm forming parts in which the parts subject to wear have been minimized, and in this way minimize the possible number of parts which can become loose or otherwise interfere with the preset fixed linear movement of the carriage.

It has been suggested in the prior art to utilize inclined rollers for supporting the carriage and for maintaining it in its fixed line of movement, but these have the disadvantage in that an increase of load on the carriage and thus on to the inclined body wheels provide a wedge-effect which binds the carriage more or less to its inclined tracks on which it is supported and this wheeled wedge tends to resist the desired freedom of rolling movement of the carriage. The present disclosure features, in so far as its load transmitting rollers are concerned, an arrangement whereby the weight of the carriage and the parts hung therefrom are transmitted through broad bearing surfaces engaging wheel trucks which include upstanding broad wheels for transmitting the weight of the carriage and the tools hung therefrom onto horizontally disposed tracks formed within the supporting arm. In the present disclosure no attempt is made to provide for any adjustment of these load sustaining wheel trucks even though the parts may wear away in service, for the operation of the carriage is in no way affected if during use it happens to be lowered slightly by reason of the wearing away of the interengaging surfaces of tracks and traction wheels.

The disclosure also features centering guide rollers which in their engagement with overhanging inclined guide surfaces are not required under normal operating conditions to carry any load therethrough, but act solely in their normal light bearing engagement with the guide rails to maintain the carriage centered in its longitudinal traverse. As these guide rollers and guide surfaces on the arms do eventually evidence some relatively slight degree of wear, the present disclosure has for another object the providing of a simplified form of adjustment by means of which these guide rollers may be elevated to maintain a preset degree of light bearing engagement with their associated guide surfaces.

Incidental to the general desire to form the carriage rugged and thus minimize the development of tortional strains while in use, the disclosure features the location of both the load bearing and the guide rollers in groups at opposite ends of the carriage, and with the rollers forming associated pairs and spread apart as widely as the size of the apparatus permits. The present application constitutes a companion case with application filed under even date, Serial No. 505,107, entitled Arm for woodworking machine.

Various other objects and advantages of the invention will be in part obvious from an inspection of the accompanying drawing and in part wil be more fully set forth in the following particular description of one form of apparatus embodying the invention, and the invention also consists in certain new and novel features of construction and combination of parts hereinafter set forth and claimed.

In the drawing:

Fig. 1 is a view largely in side elevation with one end in vertical medial section through a preferred embodiment of the carriage feature of the invention and showing the ends of the shifting belt secured to the carriage;

Fig. 2 is a plan view looking down upon the carriage of Fig. 1 with the end yokes carrying the inclined rollers omitted; and Figs. 3 and 4 are each transverse sectional views taken through the carriage, taken respectively on the lines 3—3 and 4—4 of Fig. 1 and also taken through the associated parts of the supporting arm.

This supporting arm is more fully described in the companion application and only so much of it is here disclosed as is necessary to show its relation to the carriage.

Referring to as much of the arm 10 as is herein illustrated, it is noted that it forms a hollow casing including a top wall 11, side walls 12 and 13 and a bottom wall 14. The bottom wall is provided along its longitudinal medial plane with a longitudinally extending slot 15 which forms on opposite sides thereof a pair of rugged upwardly facing tracks 16 and 17. Depending from the upper wall 11 and formed integral therewith, is a pair of guide rails 18 and 19, the under sides of which provide guide surfaces 20 and 21 facing downwardly and inwardly inclined at an angle of 45° toward the longitudinal medial plane a—b through the arm. The carriage indicated generally by the reference 22 is drawn lengthwise along the arm by a belt 23 the free ends of which are secured to the opposite ends of the carriage and forms therewith an endless member trained about pulleys on opposite ends of the arm and more fully described in the above identified co-pending application. The carriage is formed primarily of a long rugged block 24, reduced in height at opposite ends, with an upper portion 25 contained within the outlines of the arm and a lower portion 26 which has a rather snug but freely sliding fit transversely in the slot 15 as particularly shown in Fig. 3.

It is understood that cutting tools usually with motors have a driving attachment to the tool, are hung through the agency of different forms of attachments to the carriage. In the showing in Fig. 1 a bottom plate 27 symbolically represents one of the tools and is demountably secured to the carriage by bolts 28. For a different form of tool the carriage is provided centrally thereof with an upstanding king bolt hole 29 adapted to receive a tool hanging element not shown.

Opposite ends of the carriage are of identical construction so that the detailed description of one end will be sufficient for the opposite end. The block 24 is drilled transversely adjacent opposite ends to provide a hole 30 in each of which is mounted a wheel truck 31 particularly shown in Fig. 3. The wheel truck includes a rugged axle 32 secured to opposite ends of which are wide flat faced bearing rollers 33 and 34 engaging respectively the tracks 16 and 17. Located between the axle and filling the space between the same and the cylindrical wall of the hole 30 are anti-friction devices in the form of long rollers 35 designed to provide broad means for transmitting the weight on the carriage directly onto the axle and hence through the rollers 33 and 34 onto the tracks. Opposite ends of the hole 30 are provided with annular closures 36 for closing opposite ends of the hole and for resisting axial movement of the roller bearings. Felt washers 37 are located between the closures 36 and the ends of the anti-friction roller 35 at each end of the hole 30.

Opposite ends of the block are reduced top and bottom to provide extensions 38. Each of these extensions is provided with a rectangular socket or recess 39 which extends vertically through the extension and is opened at the outer end 41 of the associated extensions. Located in each of the sockets is a Y-shaped yoke 42. The stem portion 43 of the yoke is in the form of a block dimensioned to fit snugly in the rectangular socket 39. The upper end of the yoke is bifurcated as particularly shown in Fig. 4 and forms two widely spreading arms 44 and 45 projecting toward the guide rails 18 and 19. Guide rollers 46 and 47 are mounted respectively, in the arms 44 and 45 and are journaled on rugged axles 48 and 49 for rotation about axis extending parallel to the associated guide surfaces 20 and 21. The axis of the axle 32 and the axes of the axles 48 and 49 lie in the sides of a right triangle with the axle 32 at the hypotenuse of the triangle and with the medial plane a—b bisecting the right angle.

The opened ends of the sockets 39 are closed by end plates 50 and 51 which are L-shaped in vertical section as shown in Fig. 1. The end plates are secured in position by four spaced apart screws 52 and 53 passing through the upstanding wall of the end plates. The bottom walls 55 of the end plates underlap the sockets 29 and are each provided centrally thereof with an upstanding set screw 56 in threaded engagement with the bottom wall 55 and forming a stop for limiting the downward movement of the stem portion 43. Lock nuts 57 secure the set screws in their vertically adjusted position. The end plates are each provided with an outstanding flange 58 to which the ends of the belt 23 are secured by screws 59.

It is understood that by adjusting the set screws 56 at either or both ends of the carriage the associated guide rollers are elevated and locate their axles fixed in that position, considered vertically, which will bring the guide rollers 46 and 47 into light bearing engagement with their associated guide surfaces. As the load sustaining rollers on the wheel trucks and the tracks wear away these guide rollers will, of course, similarly, drop down away from their desired light engagement with the guide surfaces. In this case it is merely necessary to make such adjustments of the guide roller yokes as will raise them sufficient to compensate for wear, not only at the bearing rollers but also to compensate for any incidental wear which may occur at the guide rollers in their relation to the guide surfaces.

It is thus seen that the necessary adjustments to maintain the carriage in its initially set position relative to the arm has been reduced to two simple set screws at 56 which will provide for all the nicety of adjustment required in machines of this kind even after they have been subjected to long and severe usage.

What is claimed is:

1. In a woodworking machine, the combination of a hollow cantilever arm including a lower wall provided with a longitudinally extending slot and forming a pair of tracks on opposite sides of the slot, said tracks having their upper surfaces in a horizontal plane, said arm also provided therein with a pair of inclined guide rails, one above each track, and a carriage including a rugged block-like body portion fitted with a rather snug but freely sliding fit transversely in the slot and having its upper portion within the arm and its lower portion depending below the same, the upper portion having a pair of wheel trucks journalled therein for transmitting the weight of the carriage on to the upper surface of the tracks at four widely spaced apart points, opposite ends of the carriage provided with non-circular sockets extending vertically therethrough and open through the adjacent end of the carriage, a pair of yokes, one for each socket and provided with a similar non-circular stem portion vertically adjustably mounted therein, each yoke including a pair of upwardly and outwardly facing rollers, one for each guide rail and initially prefixed in their relative relation and closure plates L-shaped in cross-section longitudinally of the carriage, demountably secured to the carriage at its opposite ends for closing the open ends and bottoms of the sockets.

2. In a woodworking machine, the combination of an arm including a pair of parallel load supporting tracks with their upper surfaces in a common horizontal plane and spaced apart to form a longitudinal slot therebetween, a carriage having a rugged element extending downwardly therefrom through said slot and substantially filling the slot transversely, leaving only a slight clearance between the element and the edges of the tracks defining the slot whereby the tendency of the carriage to shift laterally is resisted by the rugged element in its engagement with the adjacent edges of the load sustaining tracks, said carriage mounted to move freely along the tracks and provided with wide bearing load supporting rollers mounted for rotation about fixed horizontal axes and the entire weight of said carriage bearing vertically downward through said rollers on to said upper surfaces of the tracks, a pair of centering guideways above and paralleling the tracks, said guideways provided on their under sides with guide surfaces facing downwardly and inwardly and each surface inclined at an angle of about 45° to the longitudinal medial plane of the carriage, and the carriage provided with means for restraining its movement to a straight line, said means forming an upwardly tapered wedge fitted between said guide surfaces with a snug but freely rolling fit, said means also including a pair of centering rollers, one for each guideway, said rollers each mounted for rotation about an axis parallel to the plane of its adjacent guide surface and normally free of any load thereon and adapted in its increase of bearing engagement with its associated guide surface whenever the carriage shifts laterally towards the same to resist such lateral movement, and said guideways and roller centering means coacting to resist movements of the carriage in either lateral direction and thus tending to restrain said element from bearing laterally on either of the tracks.

3. In a wood working machine, the combination of an arm provided with a pair of tracks and a pair of guide rails above the tracks, said guide rails providing guide surfaces inclined downwardly and inwardly toward the medial vertical plane between the tracks, a tool supporting carriage slidable longitudinally in the arm, means for hanging a tool from the center of the carriage, said carriage provided with a pair of wheel trucks, one adjacent opposite ends of the carriage, for transferring the weight of the carriage on to the tracks at four widely spaced points equi-distantly spaced from the axis of the tool hanging means, a portion of the carriage at each end thereof being of relatively less cross section of material than at its mid-portion projecting lengthwise beyond both of the wheel trucks, a pair of upwardly facing guide rollers for engaging the guide surfaces to resist lateral shifting of the carriage and its associated tool hanging means, and a pair of yokes one for each pair of guide rollers and in which the rollers are journalled and with one yoke carried by one of the extensions at one end of the carriage and the other carried by the extension at the opposite end of the carriage and said yokes being each closely positioned relative to its adjacent wheel truck.

4. In a wood working machine, the combination of a hollow arm provided in its underside with a longitudinally extending slot and forming a pair of tracks on opposite sides of the slot, a carriage contained in the arm longitudinally adjustable therein and provided with a tool carrying element depending therefrom through the slot, said carriage provided with the transversely extending hole, a roller bearing in said hole providing an extensive length of engagement with the carriage and acting to transmit the weight of the carriage on to the axle along a material length thereof, a rugged axle mounted for rotary movement in the bearings about a fixed axis of rotation, and a pair of wide flat faced rollers secured to the shaft at opposite ends thereon and providing a pair of wide bearing engagements with the tracks and annular closures located between each roller and its adjacent side of the carriage for closing opposite ends of the hole and thus prevent the infiltration of dust into the bearings and for resisting axial movement of the roller bearing.

5. In a cutting machine, a reciprocating carriage organization comprising means providing a pair of spaced tracks and a pair of spaced guide rails angularly positioned with respect to the pair of tracks, the tracks and guide rails being horizontal and being stationary during the operation of the machine, a carriage movable along the tracks and provided with means for supporting a tool from the same, a first set of four rollers mounted on the carriage for engagement with the pair of tracks for supporting the entire weight of the carriage from the tracks, a second set of four rollers mounted on the carriage for light engagement with the guide rails from below and supported entirely by the carriage and vertically adjustable means to shift the axis of at least one of the rollers of said second set of four vertically to lift the same into an accurately preset engagement with its associated guide rail and thus compensate for wear between the first set of rollers and their tracks.

6. In a device of the class described, the combination of a pair of horizontal tracks, a pair of guide bars located one above each track and provided with guide surfaces facing downwardly and inwardly towards a longitudinal vertical medial plane, a tool supporting carriage provided with a pair of wheel trucks engaging the tracks and two upstanding yokes, one at each end of the carriage, and each yoke mounted for vertical adjustment in its end of the carriage, each yoke provided with a pair of rollers, one in light bearing engagement with each of the guide surfaces and mounted for rotation about an axis parallel to the plane of its associated guide surface the axes of the rollers at each end of the carriage located in the three sides of a right triangle, the hypotenuse of which coincides with the axis of the load sustaining wheel truck.

7. A tool carriage provided on opposite sides of its longitudinal medial plane with a load sustaining roller, free to turn about a horizontal axis and an outwardly and upwardly facing guide roller free to turn about an axis extending downwardly and outwardly from said medial plane, and mechanism for mounting the guide rollers for vertical adjustment and said mechanism including manually operable means accessible from the underside of said carriage for adjusting the guide rollers.

8. In a woodworking machine, a tool supporting carriage including a block-like body portion, two sets of load transmitting rollers for supporting the weight of the carriage, said carriage provided at each end and at its midwidth with an upwardly facing socket rectangular in cross section, a pair of Y shaped yokes, one for each socket, the stem portion of each yoke being a rugged block snugly fitted in its associated socket, the two arms of each yoke projecting above its block-like stem and bifurcated at its upper end, a guide roller located between each bifurcation of each arm, and each arm provided with an axle on which its associated roller is mounted the axis of each axle forming the same angle with the longitudinal medial plane to the carriage as does every other axle axes and a pair of set screws both located in said medial plane, one for each yoke, carried by the carriage and bearing upwardly against the bottom of its associated block to control the elevation of the rollers relative to the body portion.

9. In a woodworking machine, the combination of a tool supporting arm provided on its underside with a slot and forming a pair of load sustaining tracks on opposite sides of the slot, said arm provided therein with a pair of downwardly and inwardly facing guide rails one above each track, a carriage contained largely within the arm provided with four load supporting rollers engaging the tracks and said carriage having a portion thereof depending through the slot, two yokes, one for each end of the carriage and each yoke having journalled therein a pair of upwardly and outwardly facing guide rollers for engaging the guide rails and for automatically centering the load wheels, and a pair of adjusting means, one for each yoke, vertically adjusting its associated pair of guide rollers relative to the guide rails, said adjusting means carried by said depending portion of the carriage and accessible from the outside of the arm whereby adjustment of the guide rollers may be made without removing the carriage from the arm.

ALFRED E. HORMAN.